United States Patent [19]
Hunicke

[11] Patent Number: 5,850,797
[45] Date of Patent: Dec. 22, 1998

[54] ELEVATED PET BOWL

[76] Inventor: William E. Hunicke, 199 Coulwood Dr., Charlotte, N.C. 28214

[21] Appl. No.: 985,418

[22] Filed: Dec. 4, 1997

[51] Int. Cl.$^6$ ....................................................... A01K 5/01
[52] U.S. Cl. ............................................. 119/61; 119/57.9
[58] Field of Search ................................ 119/51.5, 61, 62, 119/57.8, 57.9, 74, 72; D30/133

[56] References Cited

U.S. PATENT DOCUMENTS

| | | | |
|---|---|---|---|
| 2,779,311 | 1/1957 | Hamilton | 119/61 X |
| 2,891,508 | 6/1959 | Bower | 119/57.9 X |
| 4,303,040 | 12/1981 | Mann | 119/62 |
| 4,505,228 | 3/1985 | Scott | 119/62 |
| 4,986,219 | 1/1991 | Harris | 119/61 X |
| 5,642,687 | 7/1997 | Nylen et al. | 119/57.9 X |

*Primary Examiner*—Michael J. Carone
*Assistant Examiner*—James S. Bergin

[57] ABSTRACT

A pet bowl protector is provided including a base having a post with vertically oriented upper and lower portions residing in alignment and with a circular loop formed therebetween. A pet food dish is mounted to the upper portion for containing pet food therein.

8 Claims, 3 Drawing Sheets

ELEVATED PET BOWL

BACKGROUND OF THE INVENTION

1. Field of the Invention

The present invention relates to pet bowls and more particularly pertains to a new elevated pet bowl for preventing insects, small animals and birds from infiltrating a pet dish.

2. Description of the Prior Art

The use of pet bowls is known in the prior art. More specifically, pet bowls heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet bowls include U.S. Pat. No. 5,109,800; U.S. Pat. No. 4,905,629; U.S. Pat. No. 4,953,506; U.S. Pat. No. 4,399,772; U.S. Pat. No. 4,007,711; and U.S. Pat. No. Des. 249,770.

In these respects, the elevated pet bowl according to the present invention substantially departs from the conventional concepts and designs of the prior art, and in so doing provides an apparatus primarily developed for the purpose of preventing insects, small animals and birds from infiltrating a pet dish.

SUMMARY OF THE INVENTION

In view of the foregoing disadvantages inherent in the known types of pet bowls now present in the prior art, the present invention provides a new elevated pet bowl construction wherein the same can be utilized for preventing insects, small animals and birds from infiltrating a pet dish.

The general purpose of the present invention, which will be described subsequently in greater detail, is to provide a new elevated pet bowl apparatus and method which has many of the advantages of the pet bowls mentioned heretofore and many novel features that result in a new elevated pet bowl which is not anticipated, rendered obvious, suggested, or even implied by any of the prior art pet bowls, either alone or in any combination thereof.

To attain this, the present invention generally comprises a base including a disk-shaped central portion with a plurality of legs. Each of such legs has a first end spacedly coupled about a periphery of the central portion and extended radially and downwardly therefrom. As such, upon second ends of the legs being rested on a recipient surface, the central portion is elevated. As shown in FIG. 1, the base further includes a post with vertically oriented linear upper and lower portions residing in linear alignment. Further provided is a circular loop formed between the upper and lower portions of the post. The various Figures further depict a hollow conical-shaped shade with a top apex integrally coupled to the upper portion of the post of the base. The shade resides in concentric relationship with the post and at least partially conceals the loop of the base. It should be noted such is accomplished at a location distanced from the loop. FIGS. 1 & 3 show a bead assembly including an annular mounting ring coupled to an inner surface of a peripheral bottom edge of the shade. The mounting ring has a plurality of a strings of beads connected to the mounting ring which depend downwardly therefrom to an approximate midpoint of the lower portion of the post. Next provided is a pet food dish including a hollow outer shell having a frusto-conical configuration. Associated therewith is an inner food containment portion defined by a portion of a hollow sphere. The food containment portion is coupled to an upper peripheral edge of the outer shell. A lower central portion of the food containment portion is integrally coupled to a top end of the upper portion of the post of the base above the shade. As an option, a cover assembly in cludes a bracket coupled to the upper portion of the post and extended upwardly to define a horizontally oriented pivot rod situated in tangential relationship with the upper peripheral outer shell of the dish. The cover assembly further includes a circular cover hingably coupled to the pivot rod. By such structure, the cover is adapted for being pivoted between a raised and lowered orientation. It is imperative that the cover have a diameter greater than that of the upper peripheral edge for allowing a pet to easily raise the cover to access food within the food containment portion of the dish.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is importan t, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new elevated pet bowl apparatus and method which has many of the advantages of the pet bowls mentioned heretofore and many novel features that result in a new elevated pet bowl which is not anticipated, rendered obvious, suggested, or even implied by any of the prior art pet bowls, either alone or in any combination thereof.

It is another object of the present invention to provide a new elevated pet bowl which may be easily and efficiently manufactured and marketed.

It is a further object of the present invention to provide a new elevated pet bowl which is of a durable and reliable construction.

An even further object of the present invention is to provide a new elevated pet bowl which is susceptible of a low cost of manufacture with regard to both materials and labor, and which accordingly is then susceptible of low prices of sale to the consuming public, thereby making such elevated pet bowl economically available to the buying public.

Still yet another object of the present invention is to provide a new elevated pet bowl which provides in the apparatuses and methods of the prior art some of the advantages thereof, while simultaneously overcoming some of the disadvantages normally associated therewith.

Still another object of the present invention is to provide a new elevated pet bowl for preventing insects, small animals and birds from infiltrating a pet dish.

Even still another object of the present invention is to provide a new elevated pet bowl that includes a base having a post with vertically oriented upper and lower portions residing in alignment and with a circular loop formed therebetween. A pet food dish is mounted to the upper portion for containing pet food therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
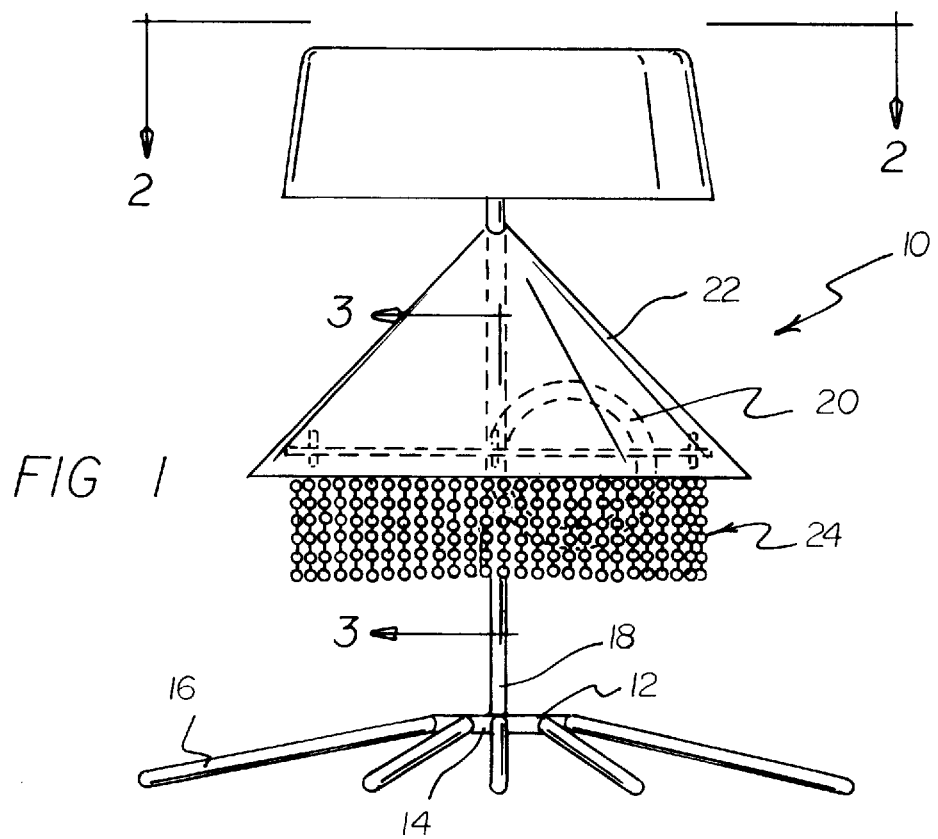
FIG. 1 is a side view of a new elevated pet bowl according to the present invention.
Figure 2:
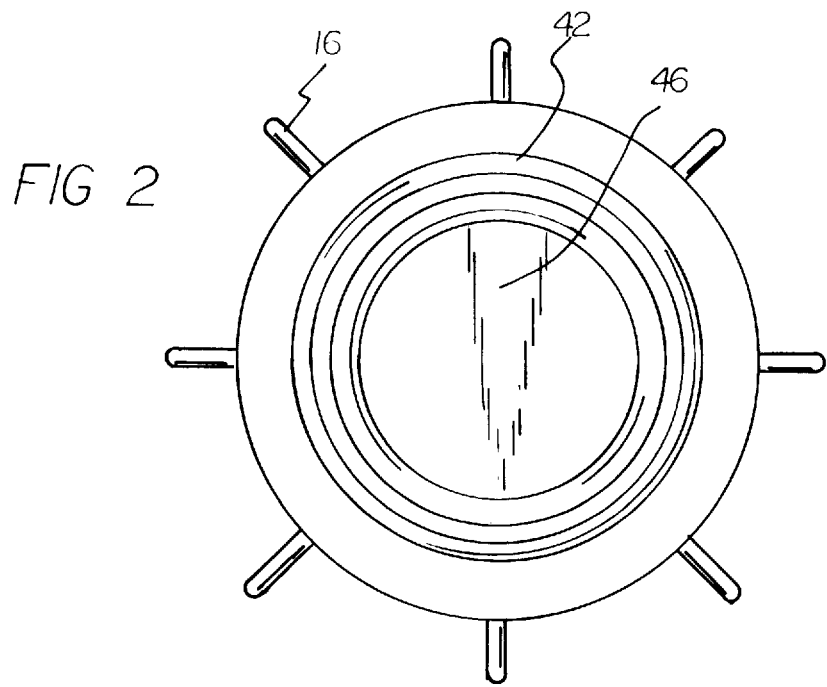
FIG. 2 is a top view of the present invention.

With reference now to the drawings, and in particular to FIGS. 1 through 7 thereof, a new elevated pet bowl embodying the principles and concepts of the present invention and generally designated by the reference numeral 10 will be described.

The present invention, as designated as numeral 10, includes a weighted base 12 having a disk-shaped central portion 14 with a plurality of legs 16. Each of such legs has a first end spacedly coupled about a periphery of the central portion and extended radially and downwardly therefrom. As such, upon second ends of the legs being rested on a recipient surface, the central portion is elevated. As shown in FIG. 1, the base further includes a post 18 with vertically oriented linear upper and lower portions residing in linear alignment. Further provided is a circular loop 20 formed between the upper and lower portions of the post. It is imperative that no portion of the loop be in contact with itself for preventing insects and the like from easily escalating the post.

The various Figures further depict a hollow conical-shaped shade 22 with a top apex integrally coupled to the upper portion of the post of the base. The shade resides in concentric relationship with the post and at least partially conceals the loop of the base. It should be noted such is accomplished at a location distanced from the loop.

Figure 3:
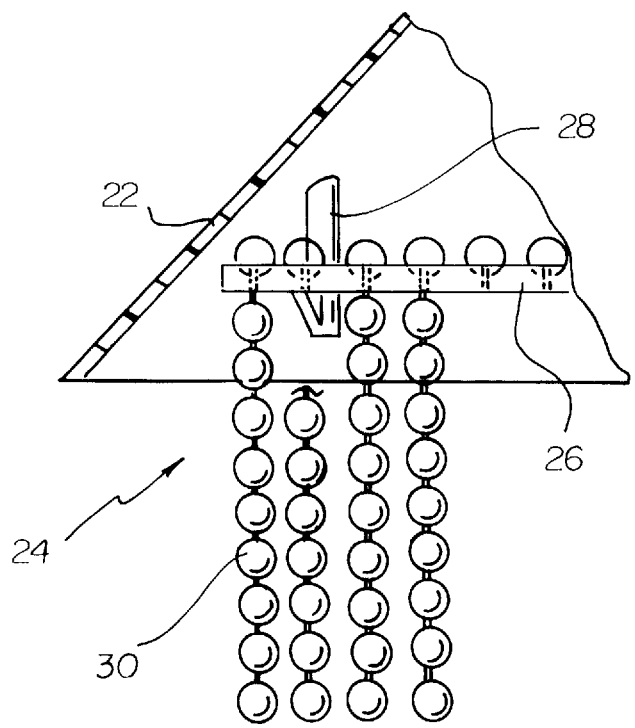
FIG. 3 is a cross-sectional view of the present invention taken along line 3—3 shown in FIG. 1.

FIGS. 1 & 3 show a bead assembly 24 including an annular mounting ring 26 coupled to an inner surface of a peripheral bottom edge of the shade. The mounting ring is preferably spaced from the cone and is mounted thereto by a plurality of supports 28. The mounting ring has a plurality of a strings of beads 30 connected to the mounting ring which depend downwardly therefrom to an approximate midpoint of the lower portion of the post. Such connection preferably comprises a counter bore formed in the mounting ring with a concentric conduit. By this structure, an uppermost bead may be situated within the associated bore with the string passing through the conduit.

Figure 4:
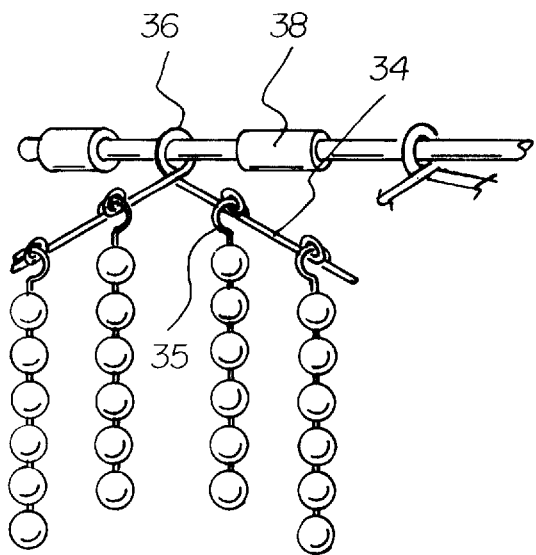
FIG. 4 is an illustration of an alternate embodiment of the bead assembly of the present invention.
Figure 5:
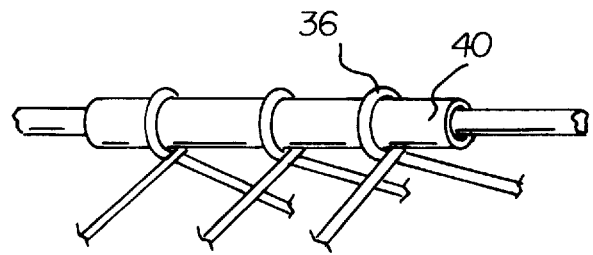
FIG. 5 is a view of another alternate embodiment of the bead assembly of the present invention.
Figure 6:
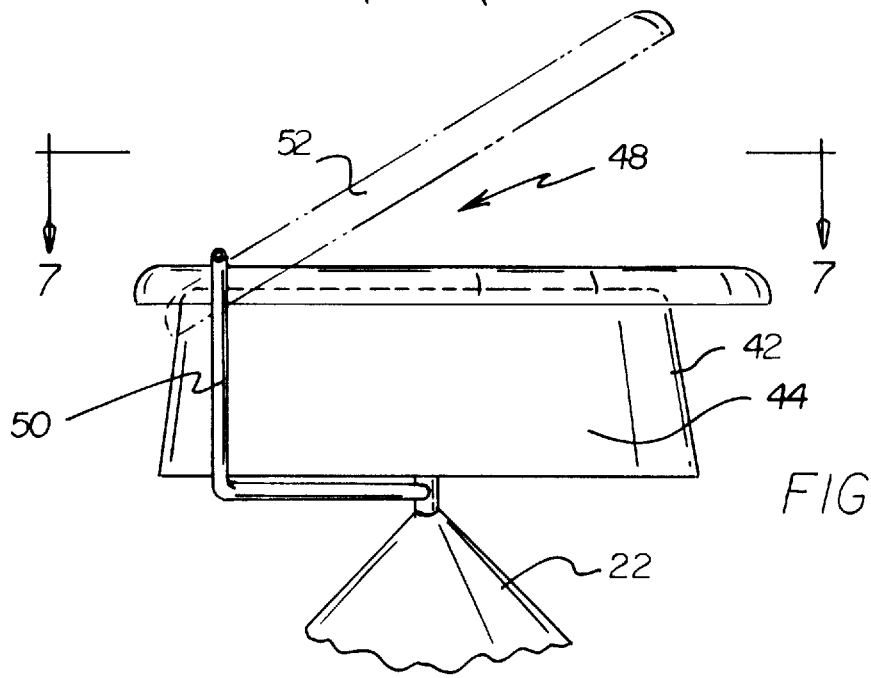
FIG. 6 is a side view of the cover assembly of the present invention.
Figure 7:
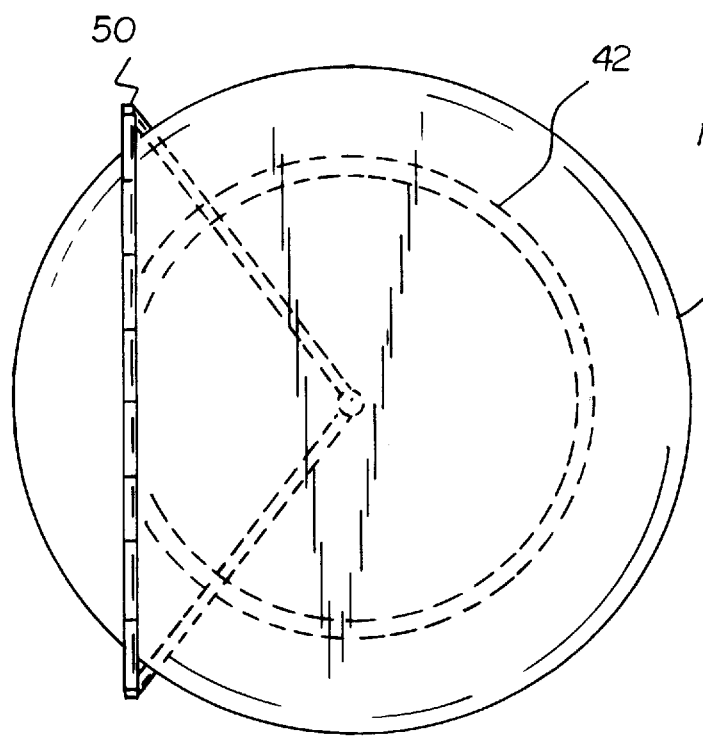
FIG. 7 is a top view of the cover assembly of the present invention.

In the alternative, the strings of beads may be mounted on a pair of arms 34 extending outwardly and downwardly in opposite directions. Note FIG. 4. Each arm is preferably equipped with a plurality of loops for releasably receiving a hook 35 connected to the uppermost bead of the associated string. Further shown in FIG. 4 is an eyelet 36 formed in a center of each arm for being situated between a pair of adjacent spacers 38 secured on the mounting ring. In yet another alternate embodiment, shown in FIG. 5, the eyelets of the arms are mounted about a loosely fitted sleeve 40 which is, in turn, secured to the mounting ring.

Next provided is a pet food dish 42 including a hollow outer shell 44 having a frusto-conical configuration. Associated therewith is an inner food containment portion 46 defined by a portion of a hollow sphere. The food containment portion is coupled to an upper peripheral edge of the outer shell. A lower central portion of the food containment portion is integrally coupled to a top end of the upper portion of the post of the base above the shade. It should be understood that the present invention may also be used to feed various other types of livestock.

As an option, a cover assembly 48 includes a bracket 50 coupled to the upper portion of the post and extended upwardly to define a horizontally oriented pivot rod situated in tangential relationship with the upper peripheral edge of the outer shell of the dish. The cover assembly further includes a circular cover 52 hingably coupled to the pivot rod. By such structure, the cover is adapted for being pivoted between a raised and lowered orientation. It is imperative that the cover have a diameter greater than that of the upper peripheral edge of the dish by at least an inch. This allows a pet to easily raise the cover to access food within the food containment portion of the dish. The cover thus functions to protect the food from birds and further protect a nose of the pet during use. As a further option, the present invention may further be equipped with lights and a music box for amusing the pet and/or owner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet bowl protector comprising, in combination:

a base including a disk-shaped central portion with a plurality of legs each having a first end spacedly coupled about a periphery of the central portion and extending radially and downwardly therefrom such that upon second ends of the legs being rested on a recipient surface, the central portion is elevated, the base further including a post with vertically oriented linear upper and lower portions residing in linear alignment with each other and with a circular loop formed therebetween;

a hollow conical-shaped shade with a top apex integrally coupled to the upper portion of the post of the base and residing in concentric relationship therewith and at least partially concealing and spaced from the loop of the base;

a bead assembly including an annular mounting ring coupled to an inner surface of a peripheral bottom edge of the shade, the mounting ring having a plurality of strings of beads connected to the mounting ring and depending downwardly therefrom to an approximate midpoint of the lower portion of the post;

a pet food dish including a hollow outer shell having a frusto-conical configuration and an inner food containment portion defined by a portion of a hollow sphere coupled to an upper peripheral edge of the outer shell, a lower central portion of the food containment portion being integrally coupled to a top end of the upper portion of the post of the base above the shade; and a cover assembly including a bracket coupled to the upper portion of the post and extending upwardly to define a horizontally oriented pivot rod situated in tangential relationship with the upper peripheral edge of the outer shell of the dish, the cover assembly further including a circular cover hingably coupled to the pivot rod for being pivoted between a raised and lowered orientation, the cover having a diameter greater than that of the upper peripheral edge of the dish for allowing a pet to easily raise the cover to access food within the food containment portion of the dish.

2. A pet bowl protector comprising:

a base including a post; and a pet food dish mounted to the post for containing pet food therein;

wherein a cone is mounted to the post;

wherein a plurality of strings of beads are coupled to the cone and depend downwardly therefrom.

3. A pet bowl protector as set forth in claim 2 wherein the cone is mounted to the post above a loop formed therein.

4. A pet bowl protector as set forth in claim 2 wherein the beads are mounted to an annular mounting ring coupled to an inner surface of a peripheral bottom edge of the cone.

5. A pet bowl protector as set forth in claim 2 wherein the pet food dish further includes a cover adapted to be opened by a pet to access food within the dish.

6. A pet bowl protector as set forth in claim 5 wherein the cover has a diameter greater than that of the pet food dish.

7. A pet bowl protector as set forth in claim 2 wherein the base includes a disk-shaped central portion coupled to a lower portion of the post and having a plurality of legs each having a first end spacedly coupled about a periphery of the central portion and extending radially and downwardly therefrom.

8. A pet bowl protector comprising:

a base including a post with vertically oriented upper and lower portions residing in linear alignment with each other and with an open circular loop formed therebetween wherein each portion of the open circular loop is spaced out of contact with respect to itself; and a pet food dish mounted to the upper portion of the post for containing pet food therein.

* * * * *